(12) United States Patent
Mathieu

(10) Patent No.: US 7,273,307 B2
(45) Date of Patent: Sep. 25, 2007

(54) SIGNALING ASSEMBLY

(75) Inventor: Daniel J. Mathieu, Sheboygan Falls, WI (US)

(73) Assignee: K.W. Muth Company, Inc., Sheboygan, WI (US)

( * ) Notice: Subject to any disclaimer, the term of this patent is extended or adjusted under 35 U.S.C. 154(b) by 52 days.

(21) Appl. No.: 11/257,556

(22) Filed: Oct. 25, 2005

(65) Prior Publication Data
US 2007/0091631 A1    Apr. 26, 2007

(51) Int. Cl.
F21S 8/10    (2006.01)
(52) U.S. Cl. ........................ 362/540; 362/516
(58) Field of Classification Search ............ 362/540, 362/541, 542, 497, 498, 499, 506, 516; 340/468, 340/463, 471, 384.4; 359/629, 634, 265
See application file for complete search history.

(56) References Cited

U.S. PATENT DOCUMENTS

| 5,014,167 A | 5/1991 | Roberts |
| 5,361,190 A | 11/1994 | Roberts et al. |
| 5,481,409 A | 1/1996 | Roberts |
| 5,788,357 A | 8/1998 | Muth et al. |
| 6,005,724 A | 12/1999 | Todd |
| 6,045,243 A | 4/2000 | Muth et al. |
| 6,076,948 A | 6/2000 | Bukosky et al. |

*Primary Examiner*—Sharon E. Payne
(74) *Attorney, Agent, or Firm*—Wells St. John P.S.

(57) ABSTRACT

A signaling assembly is described which includes a semitransparent mirror, an opaque layer attached to the semitransparent mirror, a reflector member positioned within an aperture defined by the opaque layer; a circuit board defining an aperture through which visible light can pass, and which is positioned in spaced relation relative to the semitransparent mirror; and an electromagnetic radiation emitter mounted on the rear surface of the circuit board and which emits visible light which is passed by the circuit board and an opaque layer and which is reflected from the reflector member so as to form a visibly discernable signal which is passed by the semitransparent mirror.

18 Claims, 1 Drawing Sheet

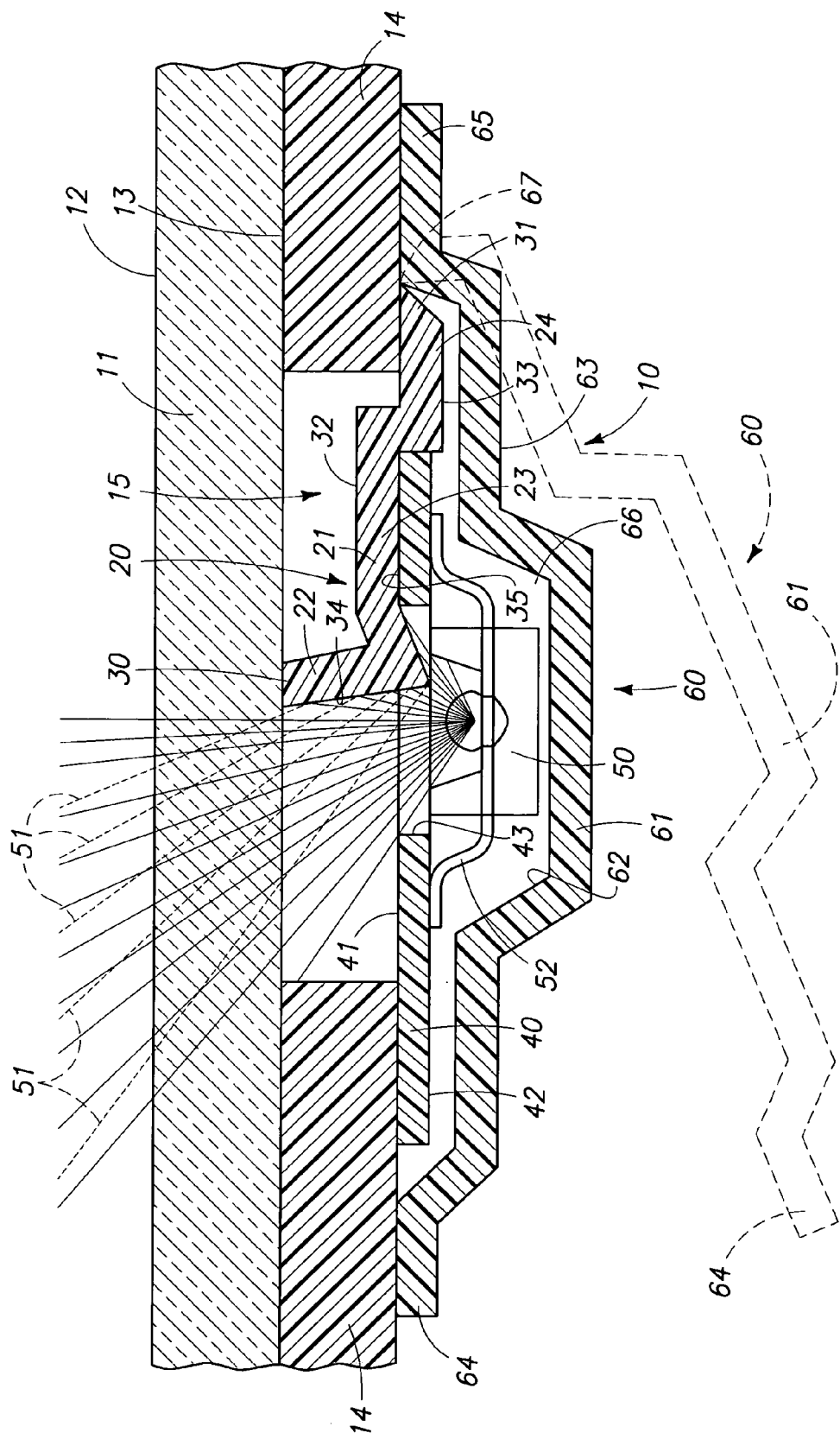

SIGNALING ASSEMBLY

TECHNICAL FIELD

The present invention relates to a signaling assembly for use on overland vehicles and the like, and more specifically to a signaling assembly having a greatly simplified design, and reduced thickness dimension which facilitates the use of the invention in close or small spaces.

BACKGROUND OF THE INVENTION

The inventor, and the assignee of the present application have endeavored to develop a wide variety of different signaling assemblies which may be utilized on overland vehicles of associated designs, and which are effective to provide a visual signal which indicates to adjoining vehicles that the overland vehicle is about ready to change lanes, brake or otherwise engage in maneuvers which might effect the adjoining vehicle. Prior art devices which were mounted on an overland vehicle, and which achieved the benefits described above, as well as providing auxiliary lighting which could be used by an operator during periods of darkness, to light the region adjacent to the vehicle, have found wide acceptance on many overland vehicle platforms. The prior art further discloses, the use of various types of semitransparent mirrors including neutrally chromatic, dichroic, and electrochromic type mirrors as well as assorted schemes for transmitting emitted visibly discernable electromagnetic radiation into given angulated orientations relative to the semitransparent mirror so as to achieve the benefits described, above. As a general matter, the prior art assemblies have all endeavored to provide an acceptable amount of light reflectivity while simultaneously passing electromagnetic radiation in an acceptable amount which forms a visual signal that can be seen by adjacent drivers, or which further can illuminate a region of the overland vehicle, or the underlying ground which is adjacent thereto.

As a general matter, the prior art devices have worked with varying degrees of success. However, the inventor has endeavored to develop a new signaling assembly which is light weight, has a reduced thickness dimension, and which can utilize a light emitting device to provide a number of benefits which were heretofore unknown. Those skilled in the art have long recognized that the space available to position a visual signaling assembly within a mirror housing, for example, is quite limited. Further, dissipation of heat generated by any light emitting assembly within a mirror housing continues to be a concern in the design of such assemblies. Furthermore, repair and/or replacement of such assemblies has sometimes been difficult.

Therefore, a visual signaling assembly which avoids the shortcomings attendant with the prior art assemblies utilized heretofore is the subject matter of the present application.

SUMMARY OF THE INVENTION

A first aspect of the present invention relates to a signaling assembly which includes a semitransparent mirror having forward and rearward facing surfaces; an opaque layer attached to the rearward facing surface of the semitransparent mirror, and which defines an aperture through which visible light my pass; a reflector member positioned, at least in part, within the aperture which is defined by the opaque layer and which further has a surface which reflects visibly discernable light; a circuit board having forward and rearward facing surfaces and defining an aperture through which visible light may pass; an electromagnetic radiation emitter mounted on the rearward facing surface of the circuit board, and which is positioned in substantially coaxial alignment relative to the aperture defined by the circuit board, and which, when energized, emits visibly discernable electromagnetic radiation which passes through the apertures defined by the opaque layer, and the circuit board, and which further is reflected, at least in part, by the reflector member so as to pass through the semitransparent mirror to form a resulting visible signal.

Another aspect of the present invention relates to a signaling assembly which includes a semitransparent mirror having forward and rearward facing surfaces; an opaque layer mounted on the rearward facing surface of the semitransparent mirror and which defines an aperture which facilitates the passage of visibly discernable electromagnetic radiation therethrough; a cover defining an internal cavity and which rests in covering relation relative to the aperture defined by the opaque layer; a circuit board received within the cavity of the cover, and which is further juxtaposed, at least in part, relative to the opaque layer, and wherein the circuit board has a rearward facing surface, and further defines an aperture through which visibly discernable electromagnetic radiation may pass; a light emitting diode mounted on the rearward facing surface of the circuit board and which is positioned in partially occluding relation relative to the aperture defined by the circuit board, and which, when energized, emits visibly discernable electromagnetic radiation which passes through the aperture defined by the circuit board; a reflector member hingedly mounted to the cover, and wherein the circuit board is juxtaposed, at least in part, relative to the reflector member, and wherein the reflector member partially occludes the apertures defined by the opaque layer, and the circuit board, and wherein the light emitting diode, when energized, emits electromagnetic radiation which is reflected, at least in part, by the reflector so as to pass through the semitransparent mirror to form a resulting visibly discernable signal.

Still further, another aspect of the present invention relates to a signaling assembly which includes a semitransparent mirror having a forward and rearward facing surface; a layer of material borne by the rearward facing surface of the semitransparent mirror, and which defines an aperture which facilitates the passage of visibly discernable electromagnetic radiation; a reflector member positioned in partially occluding relation relative to the aperture defined by the layer of material, and which rests, at least in part, thereagainst the rearward facing surface of the semitransparent mirror, and the layer of material; a circuit board having forward and rearward facing surfaces and which is positioned, at least in part, in juxtaposed relation relative to the layer of material, and the reflector member, and which defines, an aperture which facilitates the passage of visibly discernable electromagnetic radiation therethrough; a light emitting diode borne by the rearward facing surface of the circuit board and which is positioned in partially occluding relation relative to the aperture defined by the circuit board, and which when energized, emits visibly discernable electromagnetic radiation which passes through the aperture defined by the layer of material in the circuit board, and wherein a portion of the reflector member is received, at least in part, in partially occluding relation relative to the aperture defined by the circuit board; and a cover hingedly mounted to the reflector portion and which defines a cavity, and wherein the cover rests thereagainst the layer of material and receives the circuit board and a portion of the reflector member.

These and other aspects of the present invention will become more apparent hereinafter.

BRIEF DESCRIPTION OF THE DRAWINGS

Preferred embodiments of the invention are described below with reference to the following accompanying drawings.

FIG. 1 is a fragmentary, transverse vertical sectional view taken through a signaling assembly of the present invention and showing a pattern of emitted visibly discernable electromagnetic radiation provided by same.

DETAILED DESCRIPTION OF THE PREFERRED EMBODIMENTS

This disclosure of the invention is submitted in furtherance of the constitutional purposes of the U.S. Patent Laws "to promote the progress of science and useful arts" (Article 1, Section 8).

Referring more particularly to the drawing, the signaling assembly of the present invention is generally indicated by the numeral 10 in FIG. 1. As seen in that drawing, the present invention includes a semitransparent mirror 11 which has a forwardly facing surface 12, and an opposite rearwardly facing surface 13. The semitransparent mirror 10 is selected from the group comprising substantially neutrally chromatic mirrors; dichroic mirrors; and/or electrochromic mirrors. The dichroic mirrors that may be utilized effectively in the present invention are disclosed in such U.S. Pat. No. 5,014,167, the teachings of which are incorporated by reference herein. As a general matter, dichroic mirrors selectively pass predetermined bands of electromagnetic radiation by having a band-pass coating applied to same. These coatings may be of different chemical compositions and may include such materials as neodymium oxide which renders the semitransparent mirror substantially blue in appearance but which is effective, for example, in efficiently passing yellow light. The semitransparent mirrors 11 discussed above, typically have applied to their rearwardly facing surface 13 a reflective coating which gives it the characteristics discussed above, that is neutrally chromatic, dichroic, etc. This reflective layer may be of varying thickness or may be completely removed in order to allow the passage of light.

As seen in FIG. 1, the semitransparent mirror 11 has an opaque layer 14 which is applied to the rearwardly facing surface 13 thereof. The opaque layer 14 substantially impedes the passage of visible light therethrough. The opaque layer defines an aperture or region 15 through which visibly discernable electromagnetic radiation may pass. While a single aperture or region is shown herein, it should be understood that the region may comprise a plurality of small apertures which are appropriately positioned in order to form a visible signal having a predetermined appearance. As noted above, the semitransparent mirror 11 typically has a reflective coating applied to the rearwardly facing surface 13. In the arrangement as seen in FIG. 1, the opaque layer may comprise, on the one hand, the reflective coating or may, on the other hand, be applied over the reflective coating. As discussed above, the reflective coating could be removed in the aperture or region 15 through which the electromagnetic radiation passes. In another possible arrangement, the reflective coating in the aperture or region 15 may be deposited in a reduced thickness so as to pass an increasing amount of visibly discernable electromagnetic radiation therethrough so called "thin chrome." In addition, it should be understood that the opaque layer, as shown herein, may comprise a foam adhesive layer, or in the alternative a heater layer which is applied in juxtaposed relation relative to the rearwardly facing surface 13.

As seen in FIG. 1, the signaling assembly 10 includes a reflector member which is generally indicated by the numeral 20. The reflector member has a main body 21 which is generally defined by a first, second and third portion 22, 23 and 24, respectively, and which form the integral main body. Still further, the main body 21 has a first end 30 which rests thereagainst the rearwardly facing surface 13 of the semitransparent mirror, and an opposite second end 31 which lies in juxtaposed relation relative to the opaque layer 14. The main body 21 further has a forwardly facing surface 32 and an opposite rearwardly facing surface 33. As illustrated in FIG. 1, the rearwardly facing surface 33 of the first portion 22 defines at least one reflecting surface 34 which is operable to reflect emitted electromagnetic radiation, as will be discussed hereinafter. A highly reflective coating may be applied to same to effect such reflection. The emitted electromagnetic radiation is reflected in a given, acutely angulated orientation relative to the rearwardly facing surface 13 of the semitransparent mirror 11. As seen in FIG. 1, the first portion 22 rests or is otherwise juxtaposed thereagainst, and extends generally rearwardly relative to, the rearward facing surface 13 of the semitransparent mirror 11. Still further, the second portion 23 is made integral with the first portion and extends in a generally parallel orientation relative to the rearwardly facing surface 13. Still further, the third portion is made integral with the second portion and which further is generally parallel and offset relative to the second portion and is further parallel to the rearwardly facing surface 13. As illustrated, the orientation of the second and third portions defines a region 35 which matingly cooperates with a portion of a circuit board as will be discussed in greater detail below.

As seen in FIG. 1, it will be understood that the signaling assembly 10 of the present invention includes a circuit board 40 which is electrically coupled to a source of electrical power provided by an overland vehicle or the like. The circuit board is of traditional design having electrical traces (not shown) and which conduct electrical power from an overland vehicle (not shown), to at least one electromagnetic radiation emitter which will be discussed below. The electrical circuit board has a forwardly facing surface 41 which is affixed by an adhesive or other suitable fastening means, to the opaque layer 14 as illustrated. Still further, a portion of the circuit board, as illustrated, matingly cooperates with the region 35 which is defined by the main body 21 of the reflector member 20. As seen, in FIG. 1, the reflector member 20 is positioned, at least in part, in partially occluding relation relative to the aperture 15 which is defined by the opaque layer 14 and further partially occludes the aperture 43 which is defined by the circuit board. As seen in FIG. 1, at least a part of the first portion 22 of the reflector member 20 is received within or partially occludes the aperture 43 as defined by the circuit board 40.

In the arrangement as seen in FIG. 1, a light emitting diode 50 is mounted on the rearwardly facing surface 42, of the circuit board 40, and is positioned in partially occluding relation relative to the aperture 43 which is defined by the circuit board. When energized, the light emitting diode emits visibly discernable electromagnetic radiation 51 which passes through the substantially coaxially aligned apertures 15 and 43 so as to pass through the semitransparent mirror 11 to form a visible signal which can be viewed by an adjacent observer (not shown). In the arrangement as seen, the reflector member 20 has at least one reflecting surface 34 which reflects a portion of the emitted electromagnetic radiation 51 so as to cause the emitted electromagnetic radiation to pass through the semitransparent mirror 11 in an acutely angulated orientation. As should be appreciated, the reflecting surface 34 may have a substantially non-planer reflecting surface, or further define a reflector packet having multiple reflecting facets.

As seen in FIG. 1, the light emitting diode 50 is mounted on the rearwardly facing surface 42 of the circuit board 40 by means of a reverse gull wing support which is generally indicated by the numeral 52. The reverse gull wing support 52 electrically couples the light emitting diode to the source of electrical power which is typically supplied by an overland vehicle or the like. As should be apparent from studying FIG. 1, the reverse gull wing support positions the light emitting diode on the rearwardly facing surface 42 and in a substantially occluding position relative to the aperture 43, and which is defined by the circuit board 40. As seen in FIG. 1, the first portion 22 of the reflector member 20 is positioned in at least partially occluding relation relative to the aperture 43.

As seen in FIG. 1, the signaling assembly 10 of the present invention includes a cover which is generally indicated by the numeral 60, and which is hingedly mounted to the reflector member 20, and which is further affixed at least in part to the opaque layer 14. The cover member 60 has a main body 61 which is defined by a forwardly facing surface 62, and an opposite rearwardly facing surface 63. Still further, the cover has a first end 64, which lies in juxtaposed rested relation relative to the opaque layer 14 and which may be affixed thereto by an adhesive or the like, and an opposite second end 65 which is hingedly mounted 67 to the third portion 24 of the reflector member 20. The cover member 60 is shown in FIG. 1 in the closed position with solid lines with the first end 64 resting against the opaque layer 14. The cover member 60 is also shown in FIG. 1 in the open position with dashed lines. This is facilitated by the hinge 67. As seen in FIG. 1, the forwardly facing surface 62 defines a cavity 66 which encloses the light emitting diode 53 which is mounted on the reverse gull wing support 52. Still further, the cover rests in covering relation relative to the aperture 15 which is defined by the opaque layer. As should be appreciated, the cavity 66 provides a means by which heat energy which is generated following the energizing of the light emitting diode 50 may be dissipated to the surrounding environment. Additionally, the cover provides a convenient means whereby the circuit board 40 can be accessed for repair, modification, replacement or the like. As seen in FIG. 1, the signaling assembly 10 has a thin profile which makes it useful in close or small spaces, such as within the housing of an exterior mirror.

OPERATION

The operation of the described embodiment of the present invention is believed to be readily apparent, and is briefly summarized at this point.

As seen in FIG. 1, a signaling assembly 10 of the present invention is shown, and which includes a semitransparent mirror 11 having forward and rearwardly facing surfaces 12 and 13, respectively. The signaling assembly 10 further includes an opaque layer 14 attached to the rearwardly facing surface 13 of the semitransparent mirror, and which defines an aperture 15 through which visible light may pass. The signaling assembly 10 further includes a reflector member 20 positioned, at least in part, within the aperture 15, and which is defined by the opaque layer, and which further has a surface 34 which reflects visibly discernable light. The signaling assembly 10 further includes a circuit board 40 which has a forward and rearward facing surfaces 41 and 42, respectively, and which defines an aperture 43 through which visible light my pass. The signaling assembly 10 of the present invention further includes an electromagnetic radiation emitter, here shown as a light emitting diode 50, and which is mounted on the rearward facing surface 42 of the circuit board 40, and which is further positioned in substantially coaxial alignment relative to the aperture 43 which is defined by the circuit board. The light emitting diode, when energized, emits visibly discernable electromagnetic radiation 51 which passes through the apertures 15 and 43, and which are respectively defined by the opaque layer and the circuit board, and which further is reflected, at least in part, by the reflector member 20 so as to pass through the semitransparent mirror 11 to form a resulting visible signal.

In the arrangement as seen in FIG. 1, the reflector member is received, at least in part, within the aperture 43 which is defined by the circuit board. Additionally, the circuit board 40 is positioned in spaced relation relative to the rearwardly facing surface 13 of the semitransparent mirror 11. Further, the circuit board 40 is juxtaposed, at least in part, relative to the opaque layer 14, and the reflector member 20. As seen in FIG. 1, a cover member 60 is hingedly mounted to the reflector member 20, and which is further affixed to the opaque layer 14. The cover member defines a cavity 66 and the electromagnetic radiation emitter, here shown as a light emitting diode 50, is received, at least in part, within the cavity 66. As earlier discussed, the opaque layer 14 may comprise, at least in part, an adhesive layer which positions the reflector member 20 and the circuit board 40 in an appropriate orientation relative to the semitransparent mirror 11. In the arrangement as seen, the visible electromagnetic radiation is provided by a reverse gull wing mounted light emitting diode 50, and the semitransparent mirror 11 is selected from the group which comprises dichroic mirrors; electrochromic mirrors; and substantially neutrally chromatic mirrors.

More specifically, a signaling assembly 10 of the present invention includes a semitransparent mirror 10 having forwardly and rearwardly facing surfaces 12 and 13, respectively, and wherein an opaque layer 14 is mounted on the rearwardly facing surface of the semitransparent mirror and which facilitates the passage of visibly discernable electromagnetic radiation 51 therethrough. The invention 10 includes a cover 60 defining an internal cavity 66, and which rests in covering relation relative to the aperture 15 defined by the opaque layer. The invention 10 further includes a circuit board 40 which is received within the cavity 60 of the cover, and which is further juxtaposed, at least in part, relative to the opaque layer 14. The circuit board 40 has a rearwardly facing surface 42 and defines an aperture 43 through which visibly discernable electromagnetic radiation 51 may pass. A light emitting diode 51 is mounted on the rearwardly facing surface 42 of the circuit board 40 and is positioned in partially occluding relation relative to the aperture 43 and which is defined by the circuit board. The light emitting diode 50, when energized, emits visibly discernable electromagnetic radiation 51 which passes through the aperture 43 which is defined by the circuit board. The invention 10 further includes a reflector member 20 which is hingedly mounted to the cover 60, and wherein the circuit board is juxtaposed, at least in part, relative to the reflector member 20, and wherein the reflector member partially occludes the apertures defined by the opaque layer 14 and the circuit board 43. The light emitting diode 50, when energized, emits an electromagnetic radiation signal 51 which is reflected by the reflector member 20, at least in part, so as to pass through the semitransparent mirror 11 to form a resulting visibly discernable signal. In the arrangement as seen, a reflector member 20 is positioned in rested relation, at least in part, against the opaque layer 14, and the rearwardly facing surface 13 of the semitransparent mirror 11. Still further, it will be seen that the reflector member is received, at least in part, within the aperture 43 which is defined by the circuit board 40, and further the reflector member 20 has at least one reflecting surface 34 which reflects a portion of the emitted electromagnetic radiation 51 so as to cause the emitted electromagnetic radiation to pass through the semitransparent mirror 11 in an acutely angulated orientation. In the arrangement as seen, the reflector member 20 has a substantially planar reflecting surface 34, however, it should be recognized that this reflector member may have a substantially non-planar and further may define a reflecting cavity having multiple facets (not shown).

Therefore it will be seen that the present invention achieves benefits not provided for in the prior art. In particular the present invention avoids many of the costs associated with prior art manufacturing techniques. Still further, the present invention provides increased design flexibility and decreases the manufacturing costs for this type of visual signaling assembly. Still further, the present mirror assembly is highly reliable in operation and provides superior signaling capability for overland vehicles of various designs.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

I claim:

1. A signaling assembly comprising: a semitransparent mirror having first forward and first rearward facing surfaces;
   an opaque layer attached to the rearward facing surface of the semitransparent mirror, and which defines a first aperture through which visible light may pass;
   a reflector member positioned, at least in part, within the aperture which is defined by the opaque layer, and which further has a surface which reflects visibly discernable light;
   a circuit board having a second forward, and a second rearward facing surface, and defining a second aperture through which visible light may pass; and
   an electromagnetic radiation emitter mounted on the second rearward facing surface, which is defined by the circuit board, and which is positioned in substantially coaxial alignment relative to the second aperture, which is defined by the circuit board, and which, when energized, emits visibly discernable electromagnetic radiation which passes through the first and second apertures, which are defined by the opaque layer, and the circuit board, and which further is reflected, at least in part, by the reflector member so as to pass through the semitransparent mirror to form a resulting visible signal.

2. A signaling assembly as claimed in claim 1, and wherein the reflector member is received, at least in part, within the second aperture, which is defined by the circuit board.

3. A signaling assembly as claimed in claim 1, and wherein the circuit board is positioned in spaced relation relative to the rearward facing surface of the semitransparent mirror, and wherein the circuit board is juxtaposed, at least in part, relative to the opaque layer and the reflector member.

4. A signaling assembly as claimed in claim 1, and further comprising:
   a cover member which is hingedly mounted to the reflector member and which is affixed to the opaque layer, the cover member defining a cavity, and wherein the electromagnetic radiation emitter is received, at least in part, within the cavity.

5. A signaling assembly as claimed in claim 1, and wherein the opaque layer comprises, at least in part, an adhesive layer which positions the reflector member, and the circuit board in an appropriate orientation relative to the semitransparent mirror.

6. A signaling assembly as claimed in claim 1, and wherein the electromagnetic radiation emitter is a reverse gull-wing mounted light emitting diode.

7. A signaling assembly as claimed in claim 1, and wherein the semitransparent mirror is selected from the group which comprises dichroic mirrors, electrochromic mirrors, and substantially neutrally chromatic mirrors.

8. A signaling assembly as claimed in claim 1, and wherein the circuit board is affixed, at least in part, to the reflector member.

9. A signaling assembly comprising: a semitransparent mirror having first forward and first rearward facing surfaces;
   an opaque layer mounted on the rearward facing surface of the semitransparent mirror and which defines a first aperture which facilitates the passage of visibly discernable electromagnetic radiation therethrough;
   a cover defining an internal cavity and which rests in covering relation relative to the first aperture, which is defined by the opaque layer;
   a circuit board received within the cavity of the cover and which is further juxtaposed, at least in part, relative to the opaque layer, and wherein the circuit board has a second rearwardly facing surface and defines a second aperture through which visibly discernable electromagnetic radiation may pass;
   a light emitting diode mounted on the second rearwardly facing surface, which is defined by the circuit board, and positioned in partially occluding relation relative to the second aperture, which is defined by the circuit board, and which, when energized, emits visibly discernable electromagnetic radiation which passes through the second aperture, which is defined by the circuit board; and
   a reflector member hingedly mounted to the cover, and wherein the circuit board is juxtaposed, at least in part, relative to the reflector member, and wherein the reflector member partially occludes the first and second apertures, which are defined by the opaque layer and the circuit board, and wherein the light emitting diode, when energized, emits electromagnetic radiation which is reflected by the reflector, at least in part, so as to pass through the semitransparent mirror to form a resulting visibly discernable signal.

10. A signaling assembly as claimed in claim 9, and wherein the reflector member is positioned in rested relation, at least in part, thereagainst the opaque layer, and the rearward facing surface of the semitransparent mirror.

11. A signaling assembly as claimed in claim 9, and wherein the light emitting diode, when energized, emits visibly discernable electromagnetic radiation which is reflected, at least in part, by the reflector portion.

12. A signaling assembly as claimed in claim 9, and wherein the reflector member is received, at least in part, within the second aperture, which is defined by the circuit board, and wherein the reflector member has at least one reflecting surface which reflects a portion of the emitted electromagnetic radiation so as to cause the emitted electromagnetic radiation to pass through the semitransparent mirror in an acutely angulated orientation.

13. A signaling assembly as claimed in claim 9, and wherein the reflector member is received, at least in part, within the cavity defined by the cover; the first aperture, which is defined by the opaque layer; and the second aperture, which is defined by the circuit board.

14. A signaling assembly as claimed in claim 9, and wherein the reflector member has a substantially non-planar reflecting surface, and wherein a portion of the reflector member rests thereagainst the first rearward facing surface of the semitransparent mirror.

15. A signaling assembly, comprising: a semitransparent mirror having a first forward and a first rearward facing surface; a layer of material borne by the first rearward facing surface of the semitransparent mirror, and which defines a first aperture which facilitates the passage of visibly discernable electromagnetic radiation;

a reflector member positioned in partially occluding relation relative to the first aperture, and which rests, at least in part, thereagainst the rearward facing surface of the semitransparent mirror, and thereagainst the layer of material;

a circuit board having second forward and second rearward facing surfaces and which is positioned, at least in part, in juxtaposed relation relative to the layer of material, and the reflector member, and which defines, a second aperture which facilitates the passage of visibly discernable electromagnetic radiation therethrough;

a light emitting diode borne by the second rearward facing surface, which is defined by the circuit board and which is positioned in partially occluding relation relative to the second aperture, which is defined by the circuit board, and which when energized, emits visibly discernable electromagnetic radiation which passes through the first and second apertures defined by the layer of material and the circuit board, and wherein a portion of the reflector member is received, at least in part, in partially occluding relation relative to the second aperture, which is defined by the circuit board; and a cover hingedly mounted to the reflector member, and which defines a cavity, and wherein the cover rests thereagainst the layer of material, and receives the circuit board and a portion of the reflector member.

16. A signaling assembly as claimed in claim 15, and wherein the layer of material is an adhesive foam, and wherein the circuit board and the cover are affixed to the adhesive foam.

17. A signaling assembly as claimed in claim 15, and wherein the cover is affixed to the layer of material and substantially occludes the aperture defined by the layer of material.

18. A signaling assembly as claimed in claim 15, and wherein the circuit board mounts a plurality of light emitting diodes, and wherein the reflector member further defines a reflector pocket defining a plurality of reflecting surfaces which is operable to direct the emitted visibly discernable electromagnetic radiation in a plurality of acutely angulated orientations relative to the semitransparent mirror.

* * * * *

UNITED STATES PATENT AND TRADEMARK OFFICE
CERTIFICATE OF CORRECTION

PATENT NO. : 7,273,307 B2 Page 1 of 1
APPLICATION NO. : 11/257556
DATED : September 25, 2007
INVENTOR(S) : Daniel J. Mathieu It is certified that error appears in the above-identified patent and that said Letters Patent is hereby corrected as shown below:

Column 8, line 7 (Claim 3), replace "relative to the rearward facing surface" with --relative to the first rearward facing surface--.

Signed and Sealed this

Twenty-fourth Day of June, 2008

JON W. DUDAS
*Director of the United States Patent and Trademark Office*